United States Patent [19]
Nelson et al.

[11] 3,791,618
[45] Feb. 12, 1974

[54] QUIET FLOW DEVICE FOR FLUSH VALVES

[75] Inventors: Axel B. Nelson, Mount Prospect; Roman F. Spacko, Darien, both of Ill.

[73] Assignee: Sloan Valve Company, Franklin Park, Ill.

[22] Filed: May 1, 1972

[21] Appl. No.: 248,930

[52] U.S. Cl................... 251/37, 251/38, 251/118
[51] Int. Cl.................. F16k 47/02, F16k 31/383
[58] Field of Search......... 251/37, 40, 38, 118, 210; 137/625.37

[56] References Cited
UNITED STATES PATENTS

| | | | |
|---|---|---|---|
| 343,327 | 6/1886 | Lowrie | 251/210 X |
| 2,135,670 | 11/1938 | Krause | 251/118 |
| 2,649,273 | 8/1953 | Honegger | 251/118 X |

*Primary Examiner*—Arnold Rosenthal
*Attorney, Agent, or Firm*—Parker, Plyer & McEachran

[57] ABSTRACT

A piston type flush valve having a main valve seat in the body is provided with a ring-shaped quieting device adjacent the main valve seat to quiet the water flow during the closing off action of the valve.

6 Claims, 4 Drawing Figures

PATENTED FEB 12 1974  3,791,618
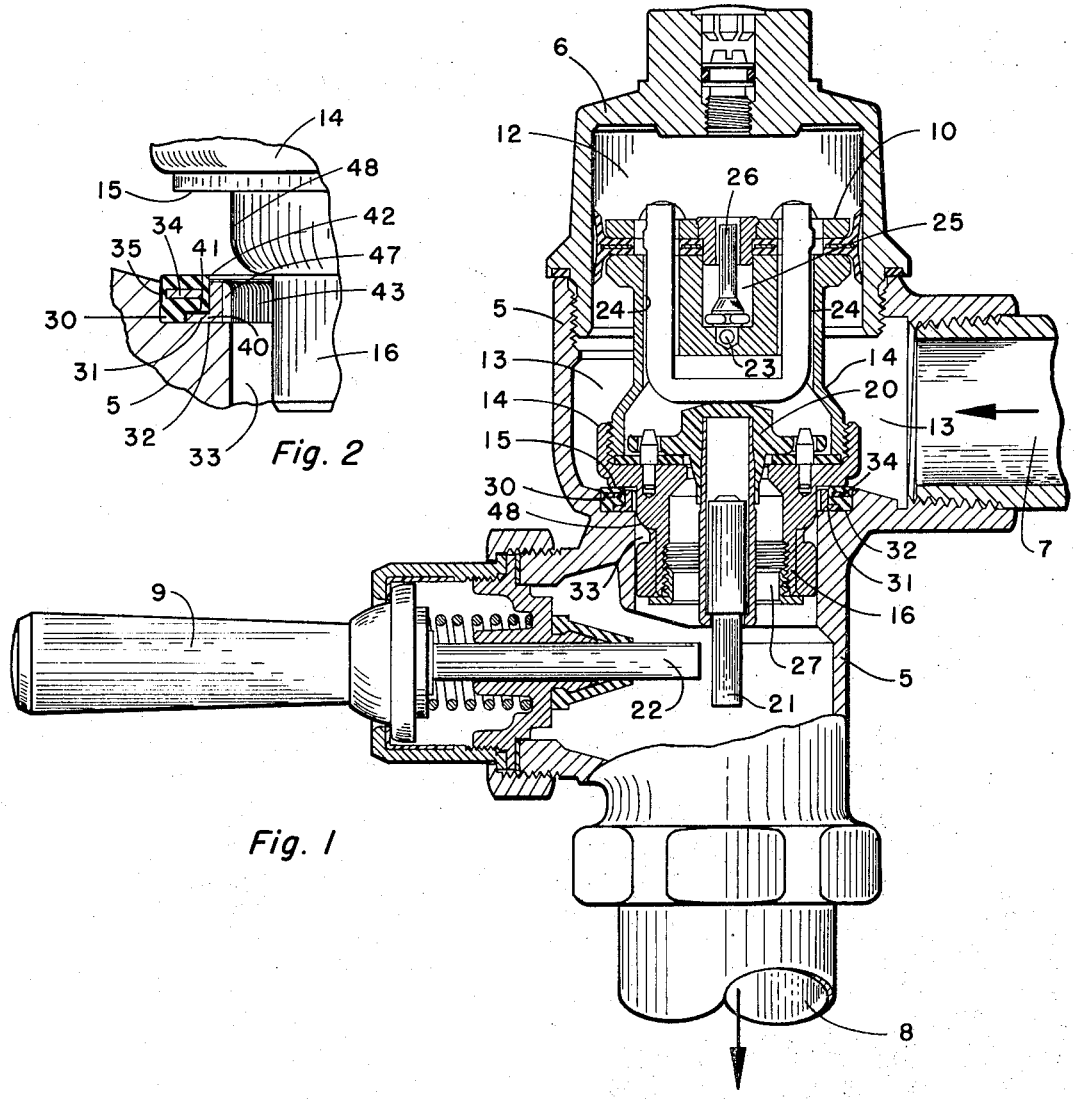
Fig. 2
Fig. 1
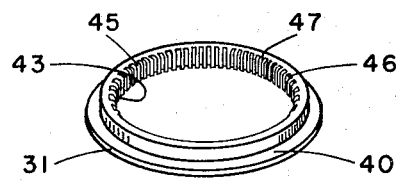
Fig. 3
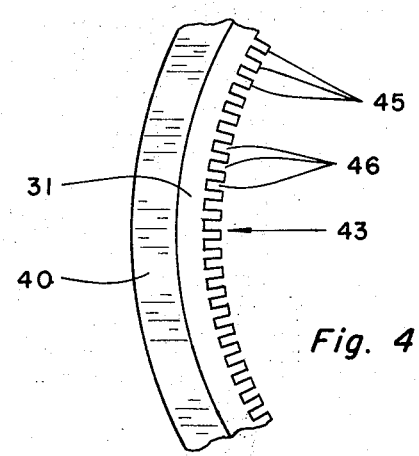
Fig. 4

3,791,618

QUIET FLOW DEVICE FOR FLUSH VALVES

CROSS-REFERENCE TO RELATED PATENTS

The present invention is an improvement on U.S. Pat. No. 2,135,670, Nov. 8, 1938; and U.S. Pat. No. 3,656,499, Apr. 18, 1972, both assigned to the same interests as the present application.

BACKGROUND OF THE INVENTION

When flush valves are installed in plumbing systems where the prevailing water supply pressures are relatively high, the valve closing action creates annoying noises throughout the flushing cycle and especially during the so-called refill portion of the flushing cycle. Many attempts have been made to quiet this closing action and refill portions of the flush valve flow of water, but these efforts have not proven entirely satisfactory in practice, or they have met with only indifferent success. Some of these quieting means have taken the form of annular screen rings adjacent the main valve seat, some employed rough surfaces or scoring, and also soft rubber washers. Some of these arrangements in commercial use are exemplified in the aforesaid patents. These former devices for quieting the valve closing action were generally costly to fabricate, readily became clogged and therefore useless, and did not altogether reduce the noise factor to an acceptable level.

It is accordingly the principal object of the invention to design a new and improved ring-shaped quiet flow throttling device adjacent the main seat of a flush valve which avoids all the disadvantages of previous types of quieting devices; which renders the flushing action of a flush valve extremely quiet; is economical to manufacture; resists wear and wire drawing; is immune to the action of corrosive waters; and is non-clogging.

Another object is to provide an improved quiet acting device for a piston type flush valve which is combined with the main valve seat as an assembled unit, and supported in the body of the flush valve.

A further object is to design a new and improved quiet flow throttling device for a piston type flush valve in which the quiet flow device and the main valve seat are combined as a unit, readily removable and replaceable in the body portion of the flush valve.

SUMMARY OF THE INVENTION

In the piston type of flush valve, such as the well known SLOAN CROWN Flush Valve, manufactured by Sloan Valve Company, Franklin Park, Ill., the piston is provided with a depending guide portion within the barrel of the flush valve, which guide serves the purpose of properly guiding the piston in the body cylinder as the valve moves to open and closed positions. The guide is also provided with a tapered portion as it moves into the valve seat opening to provide the refill portion with the amount of water for the water closet seal. The main seat is supported in the valve body and in the present invention is provided at its inner circumference with a quiet flow throttling device consisting of a ring-shaped member formed with a series of vertical grooves or serrations around its inner circumference arranged in the path of water flow through the valve seat to quiet the noise generated during the closing off cycle of the water flow, as well as throughout the entire flushing action.

DESCRIPTION OF THE DRAWINGS

FIG. 1 is a cross-sectional view showing the invention applied to a piston type of flush valve;

FIG. 2 is an enlarged section of a portion of the flush valve showing the improved quieting feature;

FIG. 3 is a perspective view of the quiet flow disc; while

FIG. 4 is an enlarged view of a portion of the circumference of the quiet flow device showing the serrations therein.

DESCRIPTION OF THE PREFERRED EMBODIMENT

In the drawings the flush valve, illustrated by way of example, includes the main body or casing 5 having a cover 6 screwed on top with an inlet water supply connection 7 on one side and an outlet flush connection 8 on the bottom end. The flush valve may be connected to either a regular water closet or urinal for flushing the same after use. An operating handle 9 is provided on the side of the body 5 for initiating the operation of the flush valve when the handle is depressed. The operating piston 10 constituting the main valve is slidable in the cover 6 and divides the casing into two chambers, an upper pressure chamber 12 and an inlet supply chamber 13. A depending guide member 14 having a lower valve seating portion 15 is supported on the piston together with a lower guide head 16. The main valve has an auxiliary or relief valve 20 with a depending stem 21, which stem is adapted to be actuated by the plunger 22 of the operating handle 9. A by-pass 23 in the piston communicates at one end with pressure chamber 12 and at the other end with inlet chamber 13. Passageways 24 also lead from the top of relief valve 20 to pressure chamber 12. The by-pass 23 is enlarged at 25 and has a movable controlling member 26 therein which partially closes the by-pass 23 leaving a small opening through which the water passes from the inlet chamber 13 to the pressure chamber 12 to hold the valve closed on the main seat.

When the relief valve 20 is tilted off of its seated position by action of the handle 9, water passes from pressure chamber 12 through passages 24 and out through the relief valve passage 27, thereby relieving the pressure in the upper chamber 12 so that the inlet supply pressure in chamber 13 now causes the piston 10 to be lifted upward and open the main valve seat to permit the full flow of water from the inlet 7 to the outlet flush tube 8. When the relief valve 20 closes again the water then passes through the by-pass 23 to pressure chamber 12 gradually increasing the pressure on top of the piston 10 and causing it to move downward and close the valve upon its seat.

The main valve seat is constituted of two separate annular elements 30 and 31 assembled as a unitary structure and supported upon the ledge or recess 32 formed in the valve body 5, and around the throat or flow passage 33 of the valve. The main seating element 30 upon which the main valve portion 15 of the piston seats, is preferably made of rubber having a metal reinforcing ring 34 embedded therein to provide stiffness to the seating portion. The valve seat 30 fits concentric and snuggly into the recess 32 in the valve body and to insure a relatively tight fit without distorting the rubber seat 30, the outside diameter has a ledge or ridge 35 formed around it which is press fitted into recess 32.

This insures that the valve seat 30 remains supported in the recess 32 under all operating conditions. FIG. 2 illustrates this particular construction clearly.

The quiet flow throttling element 31 is ring-shaped and L-shaped in cross-section, with the lower portion 40 seatable in a recess 41 formed concentric with and around the bottom side of the valve seat 30 as shown. The fit is rather snug so that the two parts 30 and 31 are held together as a unit facilitating the removal and replacing of the valve seat and quieting element whenever it is necessary to do so. The top seating edge 42 of the rubber seat 30 extends slightly above the top edge of the quiet element 30 to enable the valve seating portion 15 to tightly close upon the seat 30 to shut off the water flow. The inner diameter or edge portion 43 of the quiet element 31 forms the wall of the passage through which the water passes when the valve is open and is formed with a series of vertical serrations or grooves. The teeth 45 are equally spaced by the grooves or slots 46 around the inside of the ring 31 with the teeth 45 extending inward to a position flush in alignment with the wall of passage 33. The vertical length of the grooves and teeth is such that they extend from the bottom surface of the device and the recess 32 where the device rests, to just slightly below the top of the rubber valve seat 42 as shown in FIG. 2. The refill portion 48 of the guide 16 of the piston unit passes through the quiet device 31 and passage 33, closely adjacent the outer edges of the teeth 45 without actually touching or contacting them as the piston is moved away from and onto the valve seat 30. The purpose of this refill head 48 is to taper off the flushing action and provide an amount of water to properly fill the seal in the water closet bowl just prior to the valve closing upon its seat. The top end of the teeth 45 are rounded off as shown at 47 to better guide the refill head 48 into the valve opening.

In a flush valve having the ordinary valve seat, in addition to the noise created throughout the entire flushing cycle, a particularly loud noise or squealing occurs near the end of the flushing action and just prior to valve close off, and this is a source of extreme annoyance. The present quiet device 31 eliminates this noise, as well as during the entire flushing action. When the main valve and piston moves toward valve closing position, the guide head 48 near the end of the movement enters into and along the inner face of the quiet device 31, thus throttling and restricting the flow of water until the valve is closed. As the main valve 15 moves to its closed position and the refill head 48 passes into the passage 33, the water flow is restricted and passes through the grooves or slots 46 where it is divided into small sections or streams instead of a continuous sheet as formerly. This action effectively dissipates the energy and breaks up the jet streams caused by the increased velocity of the water as the flow is tapered off. This action therefore throttles and cushions the flow and as a result the valve closes upon its seat 30 in an extremely quiet manner. The clearance between the teeth 45 and the refill head 48 is just sufficient to permit free movement of the piston valve and by means of this construction the closing or refill action occurs without the usual noise. It will be apparent that the quieting action is achieved throughout the entire flushing action since the water flow must pass through the grooves around the water passage regardless of the position of the guide member in the passage.

In the manufacture of the device it is preferred to have the noise eliminating element 31 and the pressure receiving element or valve seat 30 assembled together, so that they can be handled and shipped as a unit, and both placed in position in the valve body or removed therefrom. They may be press fitted together using the elasticity of the rubber element 30 to hold them together without distorting the valve seat.

The quiet element 31 is preferably molded of some suitable plastic material such as DELRIN acetal plastic containing a mixture of approximately 20 percent pulverized glass. This material is relatively stable under all operating conditions which may be encountered in practice. It is non-corrosive, resists wear and wire drawing, inhibits the formation of foreign water borne particles on its surface, and is economical and easy to manufacture. All of these features render this quieting element eminently suitable for the use to which it is put.

In a preferred example of the quieting element 31, it has been found that the best results are achieved when the number of slots 46 and teeth 45 total about 120 and are 3° apart, the slots or grooves being 0.32 inch deep and 0.016 inch wide, and the teeth 0.0167 inch wide.

What is claimed is:

1. In a flush valve, a body having an inlet and an outlet with a water passage therebetween, a valve seat in said body around said passage, a piston slidable in said body for controlling the flow of water through said passage and to close upon said valve seat, a guide member supported on the bottom of said piston and positioned within said water passage, said guide member having a refill head formed thereon arranged in close proximity of said valve seat in the valve closed position in said passage, said valve seat comprising a ring-shaped member supported in said body around said water passage, a quiet flow device supported in said body around said water passage and adjacent said valve seat, said quiet flow device comprising a ring-shaped member having a series of grooves and teeth formed around its inner diameter projecting in alignment with said water passage, and in which the grooves and teeth extend vertically for the full height of the quiet flow device, the teeth being slightly rounded at the top end to guide the refill head into the water passage as the valve closes upon the valve seat, whereby water flow is quieted as said refill head enters said water passage and prior to complete valve closure upon said valve seat.

2. The combination of a quiet flow device and a valve seat for a flush valve, said valve seat being ring-shaped and having an inner stepped portion thereon, said quiet flow device being ring-shaped and having an outer stepped portion thereon, said quiet flow device being press fitted into the inner diameter of said valve seat so that the stepped portions of each member fit together and form a unitary structure readily adapted to be inserted into said flush valve, said quiet flow device having a series of alternate grooves and teeth arranged around the inner circumference thereof, said grooves and teeth being vertically disposed with the upper ends of the teeth rounded off, and means on said valve seat for holding said unitary structure in position in the flush valve.

3. The combination of the quiet flow device and valve seat as claimed in claim 2 in which the height of the quiet flow device is such that it is slightly below the height of the valve seat so as not to interfere with the closure of the valve upon the seat.

4. The combination of the quiet flow device and valve seat as claimed in claim 2 in which the valve seat is provided with a projecting portion around its outer diameter to provide a press fit into a recess formed in the flush valve body.

5. The combination of the quiet flow device and valve seat as claimed in claim 2 in which the valve seat is molded of flexible rubber having a reinforcing ring imbedded therein, and the quiet flow device is molded of DELRIN acetal plastic.

6. The combination of the quiet flow device and valve seat as claimed in claim 2 in which the number of grooves and teeth around the inner circumference of said quiet flow device totals approximately 120 and each tooth projects outward from the device a distance of about 0.32 inches and has a width of about 0.0167 inches, for optimum quietness in the water flow through the device.

* * * * *